United States Patent [19]

Toyama

[11] Patent Number: 5,699,782
[45] Date of Patent: Dec. 23, 1997

[54] WIRE SAW APPARATUS

[75] Inventor: Kouhel Toyama, Fukushima, Japan

[73] Assignee: Shin-Etsu Handotai Co., Ltd., Tokyo, Japan

[21] Appl. No.: 654,823

[22] Filed: May 28, 1996

[30] Foreign Application Priority Data

May 31, 1995 [JP] Japan ................. 7-157004

[51] Int. Cl.⁶ ........................................ B28D 1/08
[52] U.S. Cl. ................. 125/21; 125/16.01; 125/16.02
[58] Field of Search ......................... 125/12, 16.01, 125/16.02, 21

[56] References Cited

U.S. PATENT DOCUMENTS

| | | | |
|---|---|---|---|
| 3,841,297 | 10/1974 | Mech | 125/21 |
| 4,134,384 | 1/1979 | Schaff et al. | 125/21 |
| 4,160,439 | 7/1979 | Piat | 125/21 |
| 4,191,159 | 3/1980 | Collins | 125/21 |
| 4,494,523 | 1/1985 | Wells | 125/16.01 |
| 4,574,769 | 3/1986 | Ishikawa | 125/21 |
| 5,052,366 | 10/1991 | Matsukura | 125/16.01 |

FOREIGN PATENT DOCUMENTS

| | | |
|---|---|---|
| 63-260756 | 10/1988 | Japan. |
| 1-216260 | 8/1989 | Japan. |
| 8-011128 | 1/1996 | Japan. |
| 1 415 240 | 11/1975 | United Kingdom. |

*Primary Examiner*—Eileen P. Morgan
*Attorney, Agent, or Firm*—Oliff & Berridge

[57] ABSTRACT

A wire saw apparatus which improves the flatness of cut work and reduces the wire disconnection occurrence rate, is disclosed. The wire saw apparatus comprises: a wire supply part for supplying a cutting wire to a cutting part, which includes a wire supply reel bobbin; the cutting part for cutting a work, including a roller with grooves around which the cutting wire is wrapped; and a wire take-up part for taking up the cutting wire from the cutting part, which includes a wire take-up reel bobbin; wherein the dynamic balance of each of the wire supply reel bobbin, the roller with grooves, and the wire take-up reel bobbin is taken so that the quantity of unbalance thereof is not larger than 5 g·cm.

8 Claims, 5 Drawing Sheets

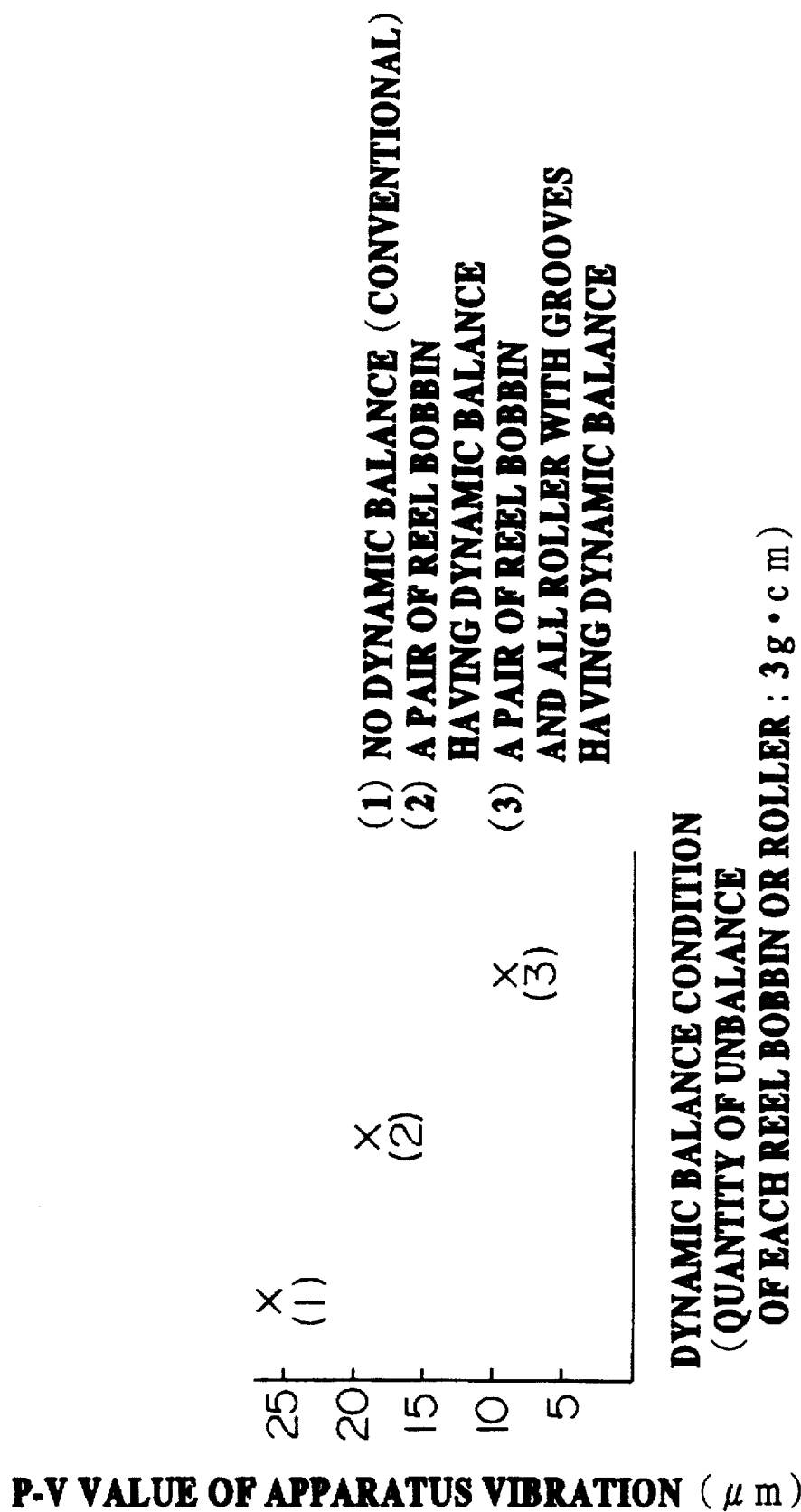

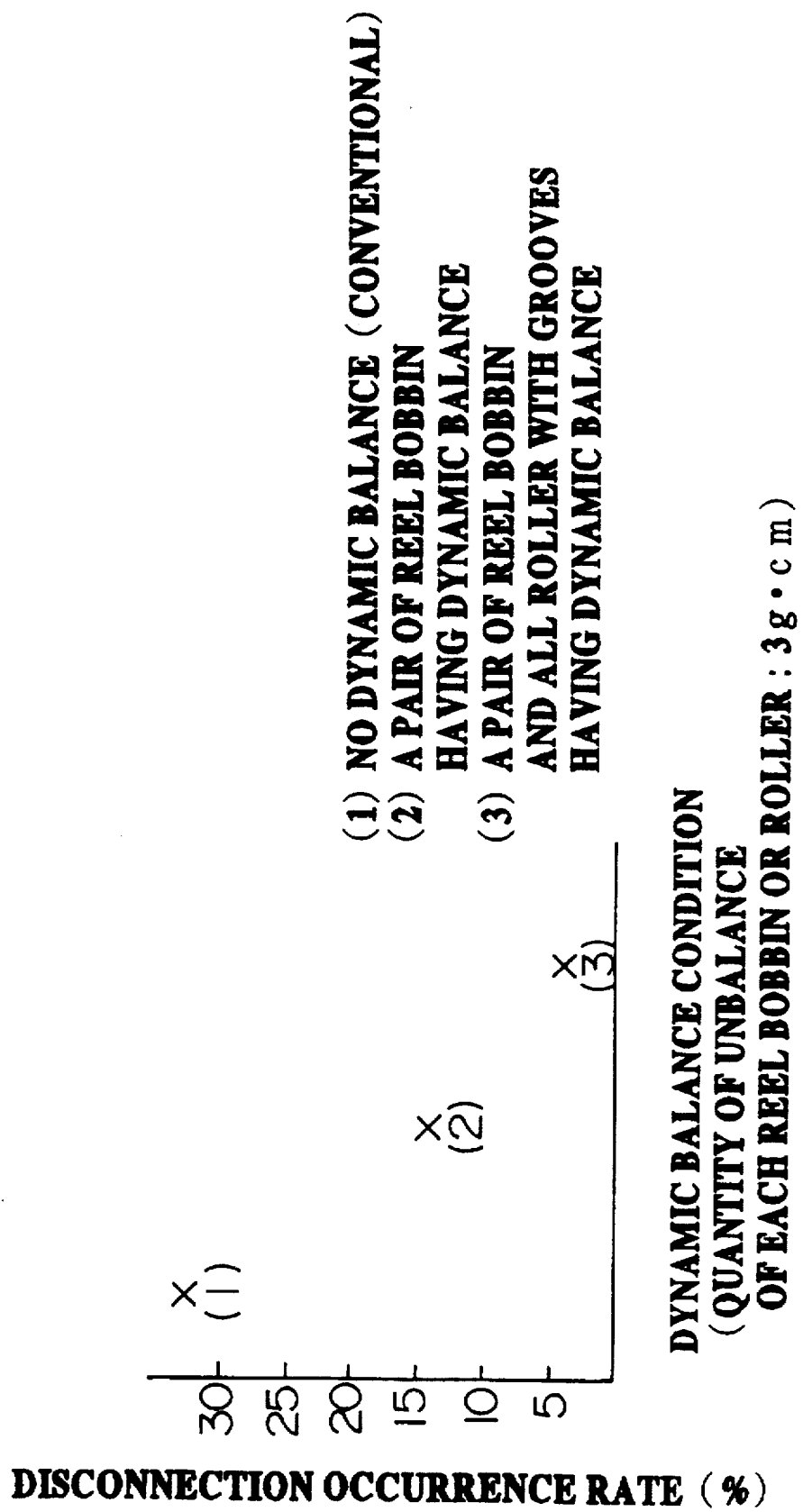

WIRE SAW APPARATUS

BACKGROUND OF THE INVENTION

1. Field of the Invention

The present invention relates to a wire saw apparatus for sawing an article to be processed, hereinafter, simply referred to a "work", e.g., a brittle material such as a semiconductor single crystal, a magnetic material, quartz, ceramics or the like, into a plurality of slices, and in particular, to an improved structure of a reel bobbin for supplying or taking-up a cutting wire and a roller with grooves for a wire saw apparatus around which a cutting wire is wrapped.

2. Description of Related Art

Conventionally, in order to manufacture a plurality of slices of a brittle material such as semiconductor wafers by cutting a work, a wire saw apparatus has been used. The wire saw apparatus comprises reel bobbins for supplying or taking-up a cutting wire, and rollers with grooves around which the cutting wire is wrapped. The roller has a lot of grooves on the periphery thereof so that each groove accepts one of plural parallel lines of the cutting wire with a constant pitch. In the wire saw apparatus, a lot of wafers are manufactured by pressing the work against the lines of the cutting wire, while supplying an abrasive slurry containing abrasive grains into between the work and the cutting wire, with a complex motion of the cutting wire which comprises a back and forth motion in a direction of the wire and a feeding motion toward the take-up reel bobbin, to cut the work by lapping action.

Although such a kind of wire saw apparatus has the disadvantage of a smaller cutting speed for cutting a work than that of an inner diameter saw, the apparatus has the advantage of cutting a lot of wafers having a large diameter simultaneously. For example, on the one hand, a cutting for a silicon single crystal having a diameter of 125 mm according to the wire saw apparatus requires several hours, on the other hand, it enables obtaining about 200 cut wafers at a time.

In such a wire saw apparatus, a large problem of generating vibrations of the reel bobbin, of the roller with grooves, and of the shafts thereof is encountered. Because a cutting wire is wrapped around the reel bobbin and the roller with grooves in a predetermined tens ion, when a shaft vibration of the reel bobbin, of the roller with grooves, or of the shafts thereof occurs, not only the flatness of the work will be degraded but the cutting wire may come to be broken because of the action of an overload. When the cutting wire is broken, a reworking for tensioning a wire is required. The reworking needs a lot of time because of being very troublesome, therefore it has a disadvantage that the work for manufacturing wafers must be stopped during such a lot of time.

SUMMARY OF THE INVENTION

The present invention was developed in view of the above-described problems. An object of the present invention is to provide a wire saw apparatus by which a considerable improvement in flatness of cut wafers can be expected and which has a small disconnection occurrence rate of the wire.

Generally, an enhancement of the cutting efficiency by a wire saw causes a degradation of the flatness of cut wafers and an increase in disconnection occurrence rate of the cutting wire. The present inventor has found that the reason of this is based on an increase of the relative speed in the back and forth motion of the cutting wire to the work.

In a conventional wire saw, the relative speed in the back and forth motion of a cutting wire to the work was about 100 m/min, and therefore the vibrations of the reel bobbin, of the roller with grooves, and of the shafts thereof were small, so that the influence thereof on the flatness of cut wafers and on the disconnection occurrence of the cutting wire were not large. However, recently, because not only cutting a work having a large diameter but also a high productivity are required, the relative speed in the back and forth motion of a cutting wire has come to be not less than 400 m/min. As a result, the vibrations of the reel bobbin, of the roller with grooves, and of the shafts thereof become larger, so that the cutting wire is partially pulled or loosened by the reel bobbin or the roller with grooves, to bring a degradation of the flatness of cut wafers and an increase in disconnection occurrence rate of the cutting wire.

The present inventor has thought of reducing the shaft vibrations of the reel bobbins and the roller with grooves, by dynamically balancing each of the reel bobbins and the roller with grooves.

In accordance with one aspect of the present invention, the wire saw apparatus comprises: a wire supply part for supplying a cutting wire to a cutting part, which includes a wire supply reel bobbin; the cutting part for cutting a work, including a roller with grooves around which the cutting wire is wrapped; and a wire take-up part for taking up the cutting wire from the cutting part, which includes a wire take-up reel bobbin; wherein dynamic balancing of each of the wire supply reel bobbin, the roller with grooves, and the wire take-up reel bobbin is performed so that the quantity of imbalance thereof is not larger than 5 g·cm. More preferably, dynamic balancing is performed so that the quantity of imbalance thereof is not larger than 3 g·cm.

Because the quantity of imbalance thereof is not larger than 5 g·cm in terms of moment, in the above-described apparatus, the vibrations of the wire supply and wire take-up reel bobbins, the roller with grooves, and the shafts thereof are very small. Accordingly, it is possible to improve the flatness of cut wafers and to reduce the disconnection occurrence rate of the cutting wire, and therefore to continue a stable operation for manufacturing wafers.

Preferably, the cutting part comprises three rollers with grooves which are arranged in an approximately triangular configuration, to form a cutting region by wrapping the cutting wire around the three rollers with grooves, to form a lot of wire lines with a predetermined pitch, and each of the rollers with grooves is dynamically balanced so that the quantity of imbalance thereof is not larger than 5 g·cm. The relative speed in the back and forth motion of the cutting wire may be not less than 400 m/min. According to the wire saw apparatus having such a structure, even if the relative speed of the cutting wire is larger than 400 m/min, it is possible to restrain a degradation of the flatness of cut wafers and an increase in disconnection occurrence rate of the cutting wire because of very small vibrations of the reel bobbins, of the roller with grooves, and the like. Preferably, the vibration of the apparatus is not larger than 10 μm in terms of peak-to-valley value (P-V value). Accordingly, it is possible to obtain wafers having a higher flatness which are well suited for large scale integrated semiconductor devices. The disconnection occurrence rate of the apparatus is preferably not more than 5%.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 3 is a diagram showing a comparison of vibration of the wire saw apparatus according to the present invention and that of a conventional apparatus, FIG. 4 is a diagram showing a comparison of disconnection occurrence rate of the wire saw apparatus according to the present invention and that of a conventional apparatus.

PREFERRED EMBODIMENT OF THE INVENTION

A wire saw apparatus according to an embodiment of the present invention will be explained with reference to the drawings, as follows.

Figure 1:
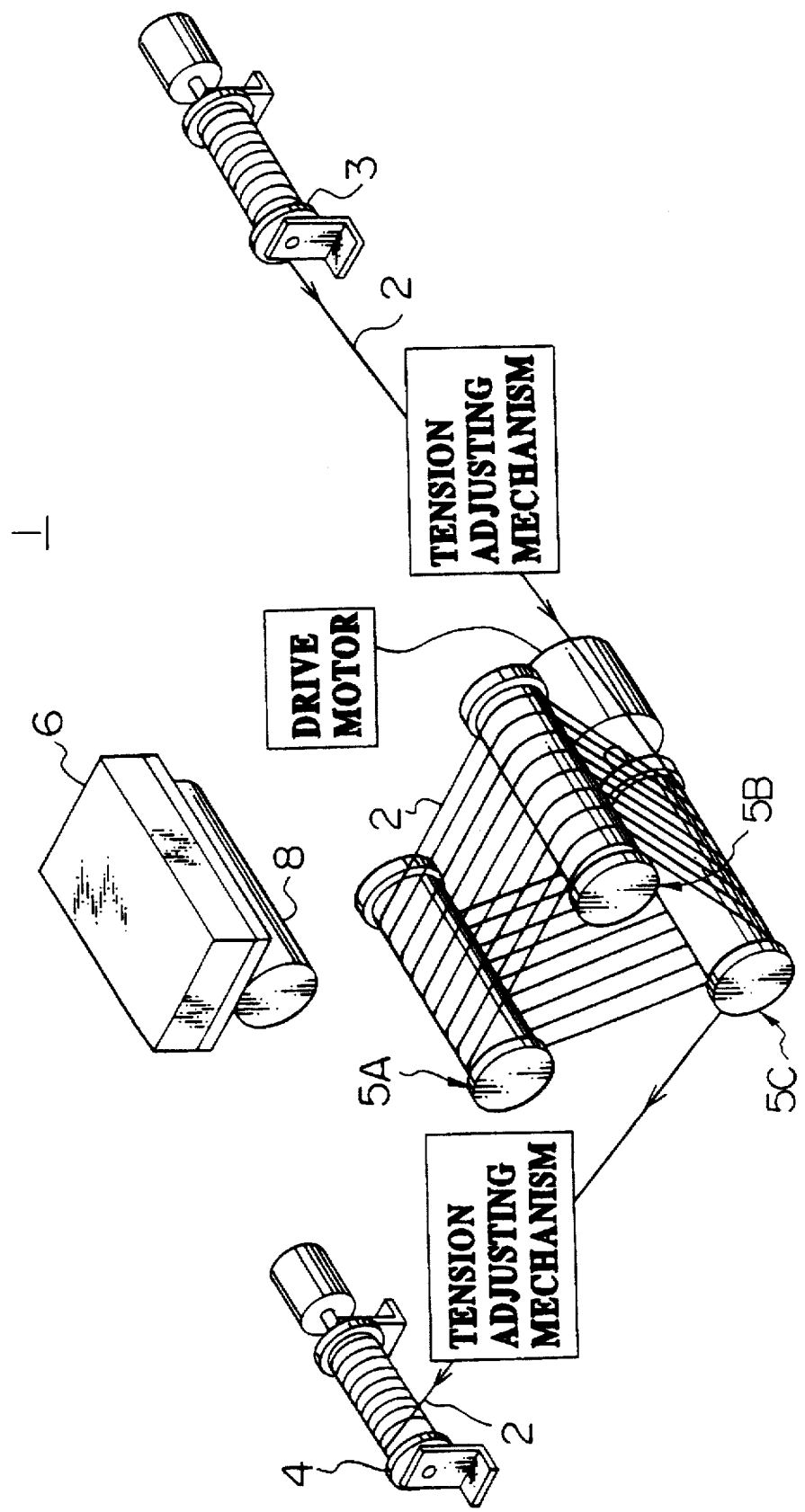
FIG. 1 is a perspective view showing the principal part of the wire saw apparatus.
Figure 2:
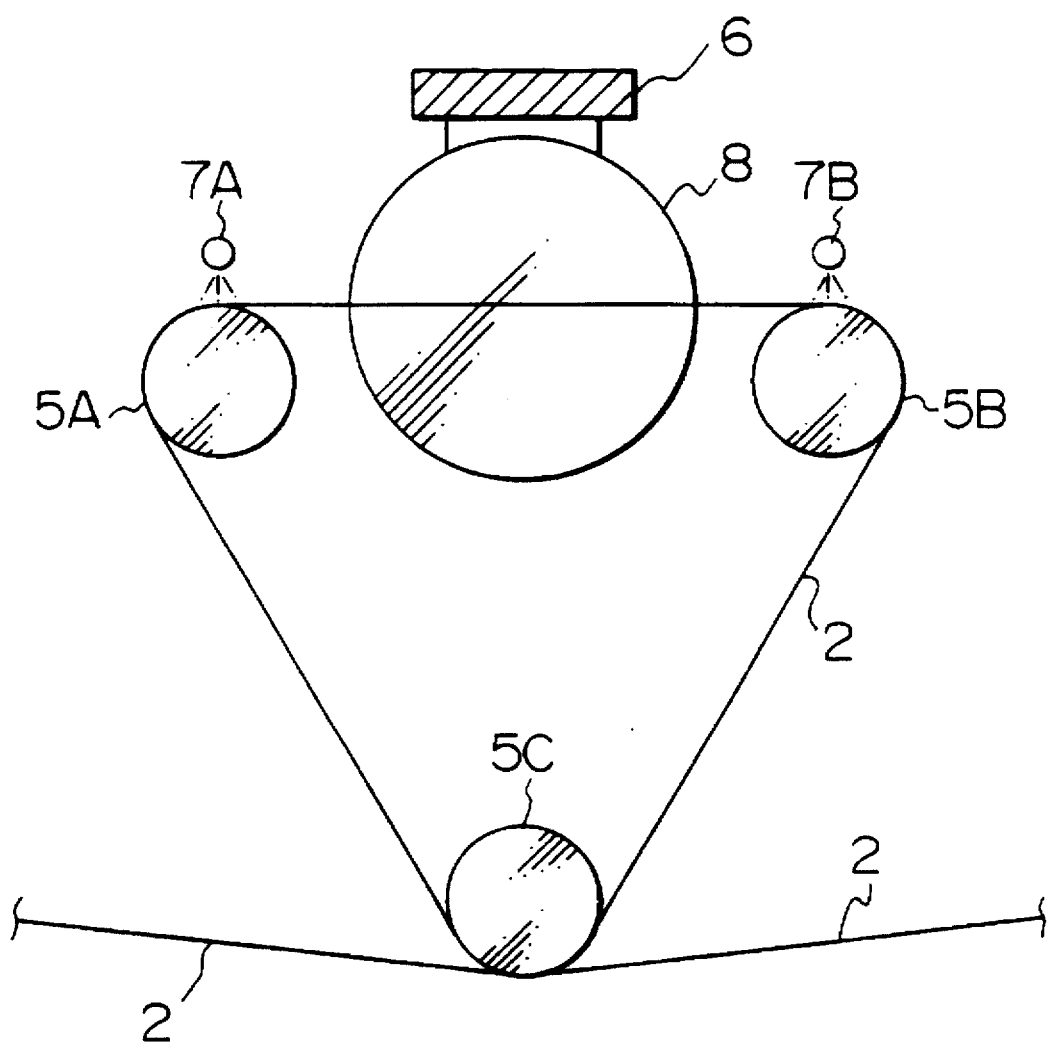
FIG. 2 is a front view showing the cutting part of the wire saw apparatus.

A principal part of the wire saw apparatus according to the embodiment is illustrated in FIG. 1. The wire saw apparatus 1 comprises a wire supply part for supplying a cutting wire 2 to a cutting part, the cutting part for cutting a work 8 such as a semiconductor single crystal ingot or the like, and a wire take-up part for taking up the cutting wire 2 from the cutting part. The wire supply part comprises a supply reel bobbin 3 around which a new cutting wire is wrapped, and a drive motor for reversibly rotating the supply reel bobbin 3 attached to a rotary shaft of the drive motor. The cutting part comprises three rollers 5A, 5B, and 5C with grooves, and a drive motor for rotating the roller 5C attached to a rotary shaft of the drive motor. The three rollers 5A, 5B, and 5C are arranged in an approximately triangular configuration which has an upper side lying approximately horizontally and in an upwardly directed relationship. Around the three rollers 5A, 5B, and 5C, the cutting wire 2 supplied from the supply reel bobbin 3 is wrapped a lot of times to form a lot of parallel wire lines with a predetermined constant pitch. Each of the three rollers 5A, 5B, and 5C has a lot of grooves each of which accepts one of the wire lines of the wrapped wire 2, in the periphery thereof. Above the parallel wire lines between the rollers 5A and 5B with grooves, a workholder 6 for holding the work 8 is arranged at a predetermined position. The workholder 6 holding the work 8 can be moved relative to the cutting part by a lifting mechanism which is not shown, so that the work 8 can be pressed against the parallel wire lines between the rollers 5A and 5B which form a cutting region therebetween. The work 8 is attached to the workholder 6 by adhering it through a carbon plate, a glass plate or the like. Above the rollers 5A and 5B with grooves, nozzles 7A and 7B for spouting an abrasive slurry containing abrasive grains to the wire lines on the rollers 5A and 5B, are respectively disposed, as shown in FIG. 2. The wire take-up part comprises a take-up reel bobbin 4 around which a used cutting wire 2 is wrapped, and a drive motor for reversibly rotating the take-up reel bobbin 4 attached to a rotary shaft of the drive motor. On each way of the cutting wire 2 from wire supply part to the cutting part, and from the cutting part to the wire take-up part, a tension adjusting mechanism for adjusting the tension of the cutting wire 2 on each way is disposed.

In the wire saw apparatus 1, wafers are manufactured by pressing the work 8 against the lines of the cutting wire between the rollers 5A and 5B, while supplying the abrasive slurry through the nozzles 7A and 7B into between the work 8 and the cutting wire 2, with a complex action of the cutting wire 2 which comprises a back and forth action in the direction of the wire and a feeding motion toward the take-up reel bobbin 4, to cut the work 8 by lapping action.

In the wire saw apparatus 1, dynamic balancing is performed so that the quantity of imbalance of each of the supply reel bobbin 3, the take-up reel bobbin 4, and the rollers 5A, 5B, and 5C with grooves is not larger than 5 g·cm.

Dynamic balancing of the supply reel bobbin 3, the take-up reel bobbin 4, and the rollers 5A, 5B, and 5C with grooves can be performed by using one of well-known methods of dynamic balancing. An example of a method of dynamic balancing will be explained, as follows.

After the wire supply part including the supply reel bobbin 3, the wire take-up part including the take-up reel bobbin 4, and the cutting part including the rollers 5A, 5B, and 5C with grooves are incorporated in the wire saw apparatus 1, a reflecting film is attached on each periphery of the supply reel bobbin 3, the take-up reel bobbin 4, and the rollers 5A, 5B, and 5C with grooves. Each revolution speed and each angle home position are detected by monitoring the reflecting film by using a fiber sensor during the rotation thereof. On the other hand, an acceleration sensor is disposed above each of the supply reel bobbin 3, the take-up reel bobbin 4, and the rollers 5A, 5B, and 5C with grooves. The displacement of each vibration thereof is determined by using the acceleration sensor. Each quantity of imbalance of the supply reel bobbin 3, the take-up reel bobbin 4, and the rollers 5A, 5B, and 5C with grooves, can be found from each displacement of the vibration, the measuring position of the displacement of the vibration, the revolution speed, and the like. When each quantity of imbalance is not in a predetermined range, a required quantity of weight is removed from a required position on the periphery of each rotary member, by using an electric drill or the like, so that the displacement of the vibration for the entirety of the wire saw apparatus 1 is in a predetermined range. Reduction of such quantity of imbalance can also be carried out by attaching a required balance weight at a required position on the periphery of each rotary member. Concretely, a displacement of the vibration of not larger than 10 μm was obtained by making the quantity of imbalance of not larger than 5 g·cm.

Accordingly, it was possible to extremely improve the flatness of cut surface of the work 8 and to reduce the cutting wire disconnection occurrence rate, and therefore to continue a stable operation for manufacturing wafers.

The effects according to the wire saw apparatus of the present invention are compared with those of conventional apparatuses in FIGS. 3 and 4. FIG. 3 shows vibrations of the apparatuses, i.e., vibrations of the wire saws, in terms of peak-to-valley value, (1) in the case of a conventional wire saw apparatus in which no dynamic balancing is performed, (2) in the case of an apparatus in which dynamic balancing is performed for only a pair of reel bobbins, and (3) in the case of the wire saw apparatus according to the present invention in which dynamic balancing is performed for not only a pair of reel bobbins but also all rollers with grooves. FIG. 4 shows cutting wire disconnection occurrence rates of the apparatuses, (1) in the case of a conventional wire saw apparatus in which no dynamic balancing is performed, (2) in the case of an apparatus in which dynamic balancing is performed for only a pair of reel bobbins, and (3) in the case of the wire saw apparatus according to the present invention in which dynamic balancing is performed for not only a pair of reel bobbins but also all rollers with grooves. In the cases of the above-described (2) and (3), the quantity of imbalance for each of the reel bobbins and the rollers with grooves was about 3 g·cm.

It is understood from these figures that in the case (3) of the wire saw apparatus according to the present invention, i.e., when dynamic balancing is performed for not only a pair of reel bobbins but also all rollers with grooves, the vibration of the apparatus is about 8 µm in terms of P-V value and the cutting wire disconnection occurrence rate of the apparatus was suppressed to about 4%. The meaning of "the disconnection occurrence rate" is hereupon the ratio of the number of wire disconnections which occurred while cutting ingots, to the number of the cut ingots. In the case (1) of a conventional system in which no dynamic balancing is performed, the vibration of the apparatus was about 26-27 µm and the disconnection occurrence rate of the apparatus was about 32-33%. In the case (2) in which dynamic balancing is performed for only a pair of reel bobbins, the vibration of the apparatus was about 18 µm and the disconnection occurrence rate of the apparatus was about 13-14%.

As a result of other experiments, it was found that when the quantity of imbalance was about 5 g·cm, the vibration of the apparatus could be suppressed to a value not larger than 10 µm in terms of P-V value and the disconnection occurrence rate of the apparatus could be suppressed to about 5% (which was about one sixth of that of a conventional system). Such a degree of the disconnection occurrence rate certainly enables continuation of a stable operation for manufacturing wafers.

It is clear from the comparison shown in FIGS. 3 and 4 that according to the wire saw apparatus of the embodiment, it is possible to extremely suppress the vibration of the apparatus and the disconnection occurrence rate of the apparatus.

Figure 5A:
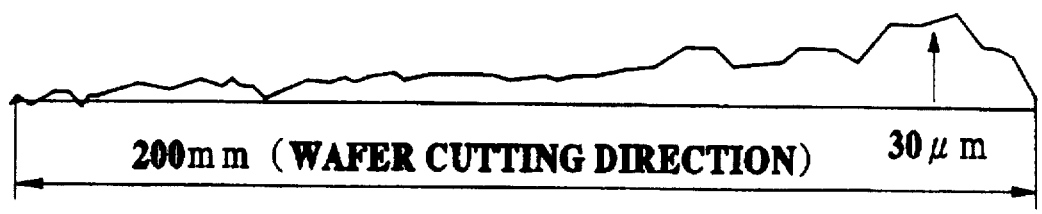
FIG. 5A is a diagram showing the flatness or the surface roughness of a wafer or the like, in the case of the P-V value of the vibration of the apparatus being larger than 25 μm.
Figure 5B:
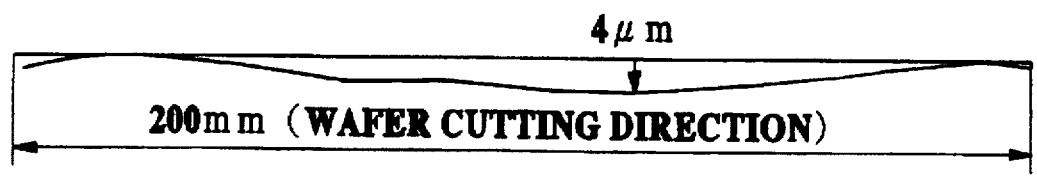
FIG. 5B is a diagram showing the flatness or the surface roughness of a wafer or the like, in the case of the P-V value of the vibration of the apparatus being not larger than 10 μm.

The results of measurement of flatness (surface roughness or wariness) of a section of a wafer or the like (having a diameter of 200 mm) in the cutting direction of the wafer, in the case of the P-V value of the vibration of the apparatus being larger than 25 µm, and of flatness of a section of a wafer or the like (having a diameter of 200 mm) in the cutting direction of the wafer, in the case of the P-V value of the vibration of the apparatus being not larger than 10 µm, are shown in FIGS. 5(a) and 5(b), respectively.

From the measurement, it was ascertained that in the case of the P-V value of the vibration of the apparatus being larger than 25 µm, the surface roughness was 30 µm in terms of P-V value, on the contrary, in the case of the P-V value of the vibration of the apparatus being not larger than 10 µm, that the surface roughness was about 4 µm in terms of P-V value. As described above, making the surface roughness to a small extent, e.g., about 4 µm, advantageously enables higher integration or higher fineness of semiconductor devices.

Although the present invention has been explained according to the embodiments, it should also be understood that the present invention is not limited to the embodiments and that various changes and modifications may be made to the invention without departing from the gist thereof.

For example, the wire saw apparatus according to the present invention is used only for cutting a semiconductor single crystal ingot in the above embodiment, however, it can be used for cutting other brittle material such as a magnetic material, quartz, or ceramics, ferroconcrete structure, or the like.

Typical advantageous effects according to the present invention will be explained as follows. Because the quantity of imbalance thereof is not larger than 5 g·cm, vibrations of the roller with grooves, and of the shafts thereof is very small. Accordingly, it is possible to improve the flatness of cut work and to reduce the cutting wire disconnection occurrence rate, and therefore to continue a stable operation for manufacturing wafers.

What is claimed is:

1. A wire saw apparatus comprising:
    a wire supply part for supplying a cutting wire to a cutting part, which includes a wire supply reel bobbin;
    the cutting part for cutting a work, including a roller with grooves around which the cutting wire is wrapped; and
    a wire take-up part for taking up the cutting wire from the cutting part, which includes a wire take-up reel bobbin;
    wherein each of the wire supply reel bobbin, the roller with grooves, and the wire take-up reel bobbin is dynamically balanced so that the quantity of dynamic imbalance thereof is not larger than 5 g·cm.

2. A wire saw apparatus as claimed in claim 1, wherein each of the wire supply reel bobbin, the roller with grooves, and the wire take-up reel bobbin is dynamically balanced so that the quantity of dynamic imbalance thereof is not larger than 3 g·cm.

3. A wire saw apparatus as claimed in claim 1, wherein the cutting part comprises three rollers with grooves which are arranged in an approximately triangular configuration, to form a cutting region by wrapping the cutting wire around the three rollers with grooves, to form a number of wire lines with a predetermined pitch, and each of the rollers with grooves is dynamically balanced so that the quantity of dynamic imbalance thereof is not larger than 5 g·cm.

4. A wire saw apparatus as claimed in claim 1, wherein a first tension adjusting mechanism for adjusting a first tension of the cutting wire is disposed between the wire supply part and the cutting part, and a second tension adjusting mechanism for adjusting a second tension of the cutting wire is disposed between the cutting part and the wire take-up part.

5. A wire saw apparatus as claimed in claim 1, wherein a speed of the cutting wire relative to the work is not less than 400 m/min.

6. A wire saw apparatus as claimed in claim 1, wherein the vibration of the apparatus is not larger than 10 µm in terms of peak-to-valley value.

7. A wire saw apparatus as claimed in claim 1, wherein the disconnection occurrence rate of the apparatus is not more than 5%.

8. A wire saw apparatus comprising:
    cutting means for cutting a work, including a plurality of rollers with grooves;
    wire supply means for supplying a cutting wire to the cutting means, the cutting wire being wrapped around the plurality of rollers; and
    wire take-up means for taking up the cutting wire from the cutting means,
    wherein the quantity of each dynamic imbalance of the wire supply means, the rollers with grooves, and the wire take-up means is not larger than 5 g·cm.

* * * * *

UNITED STATES PATENT AND TRADEMARK OFFICE
CERTIFICATE OF CORRECTION

PATENT NO. : 5,699,782
DATED      : December 23, 1997
INVENTOR(S) : Kouhei Toyama It is certified that error appears in the above-identified patent and that said Letters Patent is hereby corrected as shown below:

On the title page, item [75] Inventor: should read -- Kouhei Toyama, Fukushima, Japan --

Signed and Sealed this

Twenty-eighth Day of April, 1998

Attest:

BRUCE LEHMAN

*Attesting Officer*      *Commissioner of Patents and Trademarks*